United States Patent [19]

Brannon

[11] Patent Number: 5,058,934
[45] Date of Patent: Oct. 22, 1991

[54] FLEXIBLE AND EXTENDIBLE PIPE SECTION

[76] Inventor: Duane A. Brannon, 17268 Dos Hermanos Rd., Poway, Calif. 92064

[21] Appl. No.: 646,289

[22] Filed: Jan. 28, 1991

Related U.S. Application Data

[63] Continuation-in-part of Ser. No. 458,518, Dec. 28, 1989, abandoned.

[51] Int. Cl.⁵ ............................................. F16L 11/11
[52] U.S. Cl. .................................... 285/226; 285/292; 138/121
[58] Field of Search ................. 285/226, 227, 228, 229, 285/915, 903, 300, 55, 38, 292, 295, 294; 138/121

[56] References Cited

U.S. PATENT DOCUMENTS

| | | | |
|---|---|---|---|
| R. 27,906 | 1/1974 | Toepper | 285/226 |
| 1,565,254 | 12/1925 | Bystrom | 285/226 |
| 2,666,657 | 1/1954 | Howard | 285/226 |
| 2,934,095 | 4/1960 | Lockhart | 138/121 |
| 3,330,303 | 7/1967 | Fognler | 138/121 |
| 3,420,553 | 1/1969 | Poxon | 138/121 |
| 3,989,281 | 11/1976 | Wilde, Jr. | 285/294 |
| 4,037,626 | 7/1977 | Roberts | 285/903 |
| 4,312,383 | 1/1982 | Kleykamp | 138/121 |
| 4,627,212 | 12/1986 | Yee | 285/292 |
| 4,754,781 | 7/1988 | Jan De Putter | 138/121 |

FOREIGN PATENT DOCUMENTS

| | | | |
|---|---|---|---|
| 998412 | 1/1952 | France | 285/294 |
| 1391832 | 2/1965 | France | 285/226 |
| 1164497 | 6/1985 | U.S.S.R. | 285/226 |

Primary Examiner—Eric K. Nicholson
Attorney, Agent, or Firm—Brown, Martin, Haller & McClain

[57] ABSTRACT

A flexible and extendible pipe fitting for plastic pipe comprises a tubular bellows capable of being axially expanded and contracted and an inner lining for laminar fluid flow, where the lining is completely sealed in a fluid impervious manner to the interior ends of the fitting. Rigid hollow conduit end members are attached to opposite axial ends of the tubular bellows for sealably joining with two other pipe sections. An outer sleeve which generally conforms to the manipulation of the bellows is filled with settable material to permanently fix the pipe section in place once the desired configuration has been achieved.

20 Claims, 1 Drawing Sheet

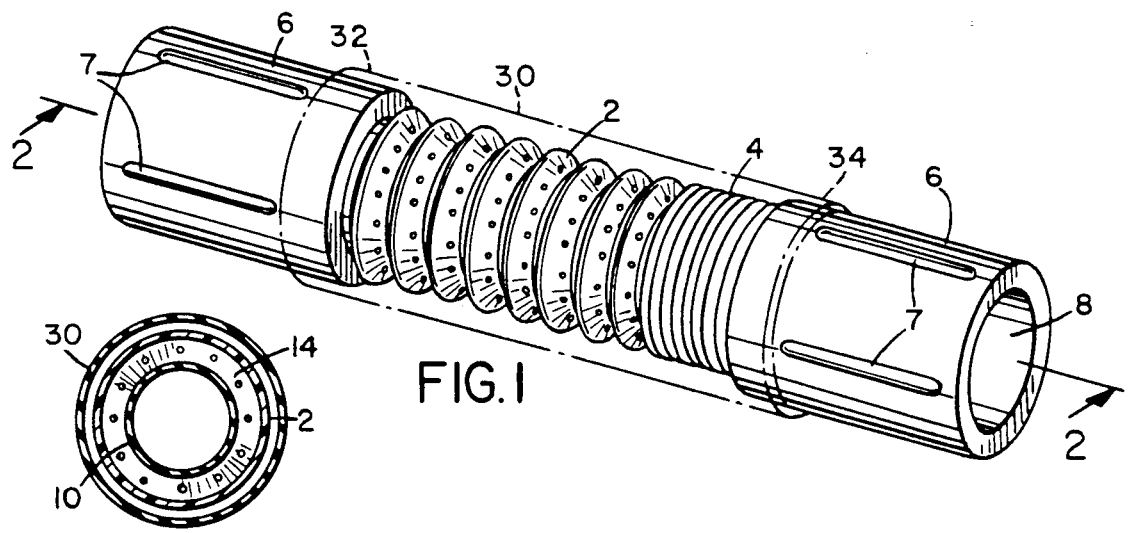
FIG. 1
FIG. 3
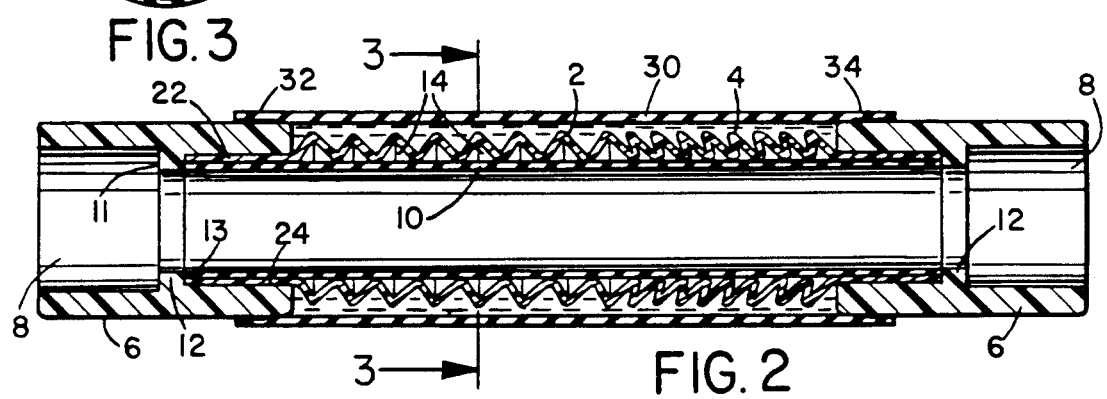
FIG. 2
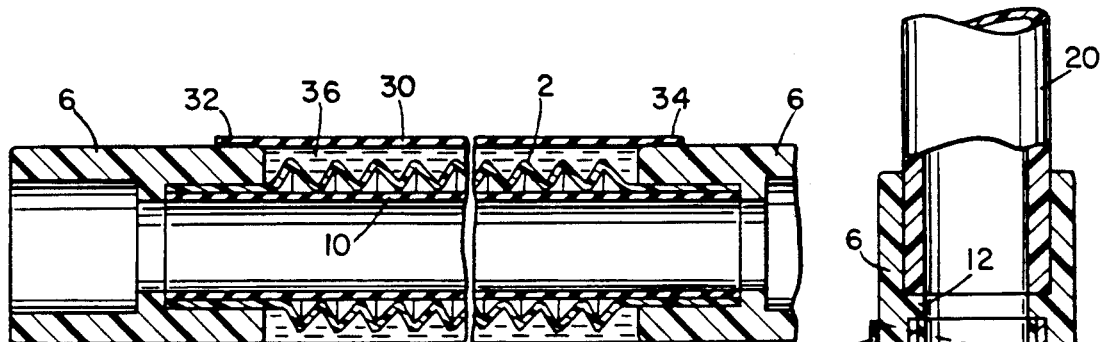
FIG. 5
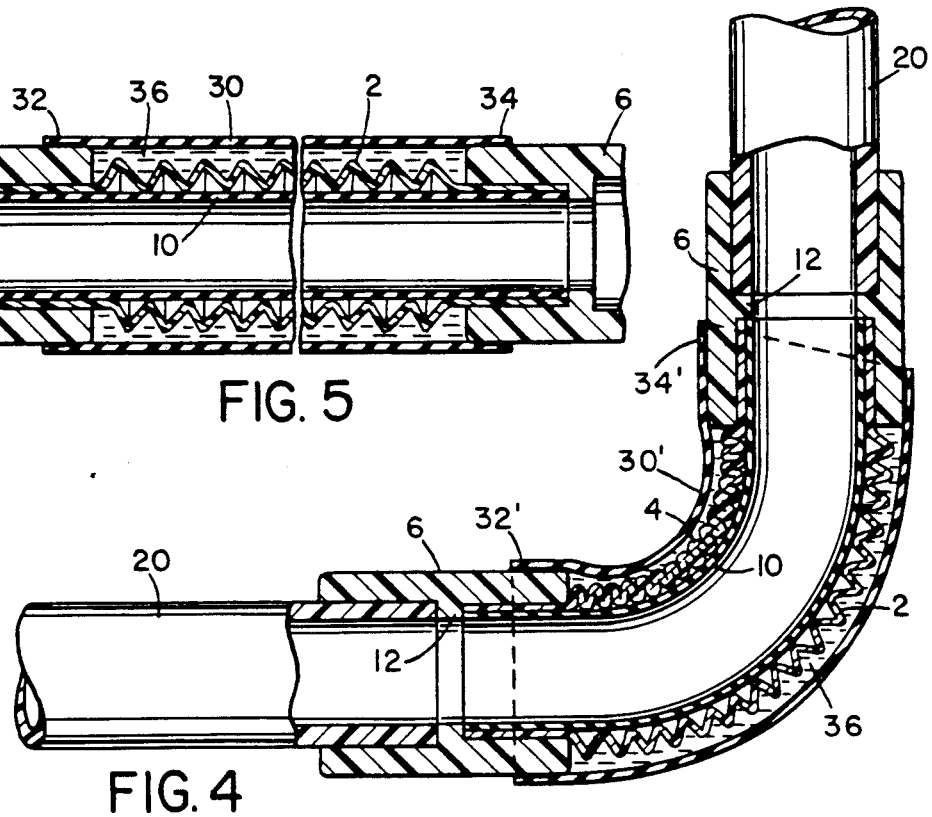
FIG. 4

FLEXIBLE AND EXTENDIBLE PIPE SECTION

CROSS-REFERENCE TO RELATED APPLICATION

This application is a Continuation-In-Part of co-pending application Serial No. 07/458,518, filed Dec. 28, 1989 now abandoned.

BACKGROUND OF THE INVENTION

I. Field of the Invention

The invention herein relates to pipe, particularly plastic pipe, and more particularly to coupling sections for such pipe.

II. Description of the Prior Art

Flexible couplings have been disclosed in the prior art for purposes of connecting misaligned plumbing for liquids or gas, for shock absorption, and for providing flexibility when the connections to which the coupling is attached are not rigidly fixed with respect to each other. Flexible couplings are of particular interest in earthquake-prone areas where it would be desirable to have substantial flexibility in water and other fluid lines and also where rapid repair of damaged pipes is required. All of the prior art devices rely on a corrugated section of either metal or plastic pipe to create a flexible bellows.

The primary disadvantages of the corrugated sections of flexible couplings are that turbulence and pressure drops are induced in the flow of fluids due to the irregularity of the pipe's inner diameter. Also, the corrugated ridges provide locations for solids suspended in the fluid to precipitate, with precipitation enhanced by turbulent flow. Build-up of sediment within the ridges will eventually restrict flow through the section. Such build-up is particularly undesirable in drains and supply lines where bacterial growth may be encouraged by the sediment. For example, high purity water supplies for electronic component manufacturing plants must be designed with a minimum of blind ends and irregularities in the lines where bacteria can multiply, bacteria being a source of particulate contaminants. In common household drain lines, organic material which settles in the ridges can decay and emit unpleasant odors. In sprinkler lines, dirt can accumulate, impeding water flow.

U.S. Pat. No. 3,549,176 discloses a flexible bellows joint which includes a solid liner to provide a smooth inner surface. The liner consists of an open mesh woven wire braid which is fixed at one end of the bellows, permitting the liner to slide within the bellows as the bellows is flexed. Such a device, while providing smoother flow, does not have an integral inner surface which eliminates the chance of sedimentation, and actually enhances the risk of bacterial growth by providing access via the movable end of the liner to a stagnant chamber between the liner and the bellows' inner walls. Also, once the joint is expanded, the wire mesh liner is unlikely to resile into the smooth configuration it had before it was stretched if it should be necessary to straighten or re-bend the joint in a different direction.

SUMMARY OF THE INVENTION

It is an object of the present invention to provide a flexible and extendible pipe fitting comprising a tubular bellows capable of being axially expanded and collapsed which has an elastic inner liner for laminar fluid flow where the lining is completely sealed to the interior ends of the fitting.

It is a further object of the present invention to provide a flexible, extendible pipe fitting comprising a tubular bellows, which has a smooth elastic inner liner and an outer sleeve containing a settable material which, once activated, will cause the coupling to become rigidly fixed into the shape into which it was formed.

It is still another object of the present invention to provide a pipe fitting which can be readily installed as a sturdy and reliable repair for damaged pipes with good resistance to warpage and pressure.

The invention herein is a flexible, extendible and contractible pipe coupling section for plastic pipe which comprises a generally cylindrical central hollow elongated conduit in the form of a tubular bellows. The bellows are capable of being axially expanded and contracted, and can be configured in a straight or curved axial configuration. Substantially rigid hollow conduit end members are connected respectively to the opposite axial ends of the central conduit. The end portions are adapted to be sealably joined to other pipe sections A generally cylindrical, continuous, elastic, flexible fluid impervious liner extends entirely through the interior of the central conduit and is joined at each end thereof to the interior surfaces of the end members in a fluid impervious manner. The liner has sufficient elasticity that a smooth inner surface of the liner is maintained without significant folding or protrusions at every position of flexure, extension and contraction of the central conduit.

After the pipe section has been expanded and bent to the desired configuration it may be fixed in that configuration by placing a settable material in a sleeve surrounding the bellows. Preferably, the sleeve is made from a material similar to that of the liner so that it can expand along with the bellows while being attached at both ends. Alternately, the sleeve is attached only at one end of the pipe section so the flexibility of the bellows is not hampered. The unattached end is free to move as needed to permit full movement of the pipe section when the outer sleeve material is not as flexible as the liner. The sleeve may contain both a settable material and a catalyst which can be activated by heat or mechanical stress. In the alternate embodiment, it may contain a single component to which a catalyst may be added to initiate setting or the sleeve may be empty, to be filled with settable material after the desired shape is achieved.

Preferably the bellows is perforated to permit the settable material to fill any gaps created by bending the pipe section, and to also set the inner liner thereby providing the strongest possible setting.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 1 is a perspective view of a typical configuration of the flexible, connector with the outer flexible sleeve partially cut away;

FIG. 2 is a sectional view taken on line 2—2 of FIG. 1;

FIG. 3 is an enlarged sectional view taken on line 3—3 of FIG. 2;

FIG. 4 is a view similar to FIG. 2, with the connector in a bent position; and

FIG. 5 is an alternate embodiment showing an outer rigidizing sleeve attached to the flexible connector at one end.

DETAILED DESCRIPTION AND PREFERRED EMBODIMENTS

As seen in FIGS. 1 and 2, the pipe coupling section has two end members 6 which permit connection to other pipe sections. The center inner portion of the coupling section is a tubular bellows 2. Liner 10 is disposed inside the coupling section, attached at both ends to the inner rings 12 and inner surfaces 22 of the end members 6. Flexible sleeve 30 is attached at sleeve end 32 to end member 6 and at sleeve end 34 to the opposite end member 6 and contains a settable material 36 for rigidizing the pipe section. In an alternate embodiment (FIG. 5), where the sleeve 30' may be less flexible, the sleeve 30' is attached at only one end 32' to end member 6 to permit the bellows 2 to slide freely within the sleeve without being limited by it.

End members 6 are cylindrical and rigid, the inner surface 8 of which is adapted to accept plastic or PVC pipe 20 of a standard outer diameter. In the alternative, the inner surface 8 may also be threaded on one or both ends with a standard pipe thread to permit joining the coupling section with pipes that have threads on their outer diameters. Ridges 7 are illustrated as one possible embodiment to facilitate handling for attaching the coupling section to pipes.

In FIG. 2, end members 6 have three different inner diameters: inner surface 8, inner ring 12, and inner surface 22. Inner surface 8 is sized to accommodate insertion of standard diameter pipe 20 to which the coupling is to be joined. The outer edge of inner ring 12 acts as a stop to prevent pipe 20 from contacting and possibly damaging the bellows 2 or liner 10. The inner edge 13 of inner ring 12 is the surface to which the ends of the bellows 2 and liner 10 are attached. The inner diameter of inner ring 12 is approximately the same diameter as that of liner 10, so that the flow of fluid is not disturbed at this point. Inner surface 24 acts as a sleeve for connection of the bellows 2 to end member 6. The end 22 of bellows 2 is a smooth cylindrical surface which is inserted into and attached to inner surface 24 by a suitable adhesive. Ends 22 will also butt up against and be fixed to inner edge 13.

The tubular bellows 2 has an inner diameter slightly greater than the inner diameter of pipe 20 to which the coupling will be joined. The outer diameter of the bellows 2 is slightly less than the outer diameter of end members 6. The ridges of bellows 2 are circular, extending completely around the coupling section. The bellows 2 is axially compressible and extendible. In FIG. 2, the section 4 of bellows 2 is shown fully collapsed, causing the ridges to orient themselves closely in contact and parallel to each other. In the preferred embodiment, bellows 2 is perforated in a regular pattern to allow settable material 36 to fill any voids created by the expansion or bending of the pipe section and to allow access to harden the inner liner.

As seen in FIG. 4, the ridges may be bent so that the upper and lower sections are out of alignment, e.g., one end is compressed while the other is fully expanded.

The tubular bellows 2 and end members 6 are formed of thermoplastic material such as polyvinyl chloride (PVC), polyvinylidene chloride or acrylonitrile-butadiene-styrene polymers.

Liner 10 is a cylinder made of an elastic and flexible material such as rubber or an elastomeric polymer. It is desirable that the liner material be chemically stable and not subject to leaching or attack by chemicals contained in the fluids to be carried. Examples of suitable materials would be latex rubber, butyl rubber, or flexible polyvinyl chloride.

Liner 10 is preferably seamless or has an inconspicuous, smooth seam. The inner diameter of liner 10 is approximately the same as that for the inner ring 12, to assure smooth flow of fluids. The ends of liner 10 are joined by a suitable adhesive to the inner diameter of the end 22 of bellows 2, and to inner edge 13.

As bellows 2 is expanded, bent or twisted, liner 10 stretches, fixed at both ends to end member 6 to provide a relatively smooth surface inside the coupling, in spite of bending. The ends of liner 10 are fully sealed to end members 6 to assure that the joint is fluid impervious. If the coupling is compressed, the liner 10 resiles as needed, still being stretched tightly enough to provide a smooth surface without any memory of prior bending or expansion as metal would have.

Liner 10 is stretched to some extent at all times, so that even in the most compressed state, space 14 is maintained between liner 10 and the outer diameter of bellows 2 to avoid pinching the liner 10, and to assure that the liner generally remains smooth with no folds or wrinkles.

Flexible sleeve 30 is preferably made from the same or similar material to that of liner 10 so that it can expand, bend or twist along with the bellows 2 and liner 10. Flexible sleeve 30 is filled with a settable material 36. Examples of such material are polymerizable methylmethacrylate monomer, silicone rubber monomer, or polysulfide rubber monomer. The sleeve is filled with a combination of catalyst and settable material which may be initially separated by a thin membrane and activated, for example, by exposure to heat or mechanical stress, releasing the catalyst subsequent to achieving the desired formation.

Alternatively, for attachment of the sleeve at only one end member, the settable material may be included in the sleeve prior to installation, with a catalyst added after the coupling has been formed in the desired shape or the settable material itself may be added into an initially empty sleeve. In both embodiments, the inclusion of a settable material 36 permits the coupling to be formed in any shape required, then permanently fixed in that shape.

In the alternate embodiment shown in FIG. 5, flexible sleeve 30' is fixed at a first end 32' to one of the end members 6 and extends at least part of the length of the coupling in the direction of the opposite end member. The sleeve 30' is initially unattached at the second end 34', and may be filled, either upon manufacture or subsequent to installation, with a settable material 36.

It will be evident that there are additional embodiments which are not illustrated above but which are clearly within the scope and spirit of the present invention. The above description and drawings are therefore intended to be exemplary only and a scope of the invention is to be limited solely by the appended claims.

I claim:

1. A flexible, extendible and contractible pipe coupling section for plastic pipe which comprises:

a generally cylindrical central hollow elongated conduit in the form of a tubular bellows, said bellows being capable of being axially expanded and contracted and of being configured in a straight or curved axial configuration;

substantially rigid hollow conduit end members connected respectively to the opposite axial ends of said central conduit, said end portions being adapted to be sealably joined to other pipe sections;

a generally cylindrical, continuous, elastic, flexible fluid impervious liner extending entirely through the interior of said central conduit and being joined at each end thereof to the interior surfaces of said end members in a fluid impervious manner, said liner having sufficient elasticity that a smooth inner surface of said liner is maintained without significant folding or protrusions at every position of flexure, extension and contraction of said central conduit; and a hollow elongated sleeve fitted over the outer surface of said central conduit in sealable contact with the outer surface of at least one of said end members, the inner surface of said sleeve and said outer surface of said conduit being spaced apart to form an annular chamber extending for at least part of the length of said central conduit, with said chamber capable of being filled with a settable material which will conform to the outer surfaces of the corrugations of said bellows and extend radially outwardly therebeyond to form a continuous body of settable material extending along at least said portion of the outer surface of said central conduit, and which upon setting forms a rigid body which maintains at least said portion of said central conduit in the configuration it had at the time of said setting of said settable material.

2. A pipe coupling section as in claim 1 wherein said central conduit and said end members are formed of thermoplastic material.

3. A pipe coupling section as in claim 2 wherein said thermoplastic material is a polymeric composition selected from the group consisting of polyvinyl chloride, polyvinylidene chloride, or acrylonitrile-butadiene-styrene polymers.

4. A pipe coupling section as in claim 1 wherein the ends of the outer surface of said liner are bonded respectively to the inner surfaces of said end members with fluid impervious circumferential adhesive bonds.

5. A pipe coupling section as in claim 1 wherein said liner is in the form of a cylinder having a thin circumferential wall.

6. A pipe coupling section as in claim 1 wherein the central portion of the outer surface of said liner is adhered to the inner circumference of at least some of the corrugations of said bellows.

7. A pipe coupling section as in claim 6 wherein said central portion of the outer surface of said liner is adhered to the inner circumference of substantially all of said corrugations of said bellow.

8. A pipe coupling section as in claim 1 wherein said liner is composed of a rubber or elastomeric polymer.

9. A pipe coupling section as in claim 8 wherein said liner is composed of rubber.

10. A pipe coupling section as in claim 9 wherein said rubber is a latex rubber or a butyl rubber.

11. A pipe coupling section as in claim 8 wherein said liner is composed of an elastomeric polymer.

12. A pipe coupling section as in claim 11 wherein said elastomeric polymer is a flexible polyvinyl chloride.

13. A pipe coupling section as in claim 1 wherein said bellows are perforated to permit said settable material to expand to fill voids between said bellows and said liner.

14. A pipe coupling section as in claim 13 wherein perforations in said bellows permit said settable material to harden said inner liner.

15. A pipe coupling section as in claim 1 wherein said annular chamber is filled with said settable material.

16. A pipe coupling section as in claim 1 wherein said annular chamber is initially empty, to be filled with said settable material after a desired configuration of said pipe coupling section has been achieved.

17. A pipe coupling section as in claim 1 wherein said settable material prior to setting is in a granular form.

18. A pipe coupling section as in claim 1 wherein said settable material is a polymerizable methylmethacrylate monomer, a silicone rubber monomer or a polysulfide rubber monomer.

19. A pipe coupling section as in claim 17 further comprising in said annular chamber a promoter material for catalyzing the polymerization and rigidizing of said settable material.

20. A pipe coupling section as in claim 1 wherein said annular chamber extends for a distance slightly longer than the length of said central conduit and extends over at least a portion of the outer surface of each of said end members such that upon setting said central conduit and said end members are maintained in a single rigid configuration.

* * * * *